Dec. 9, 1924.  
C. B. SNIDER  
1,518,940  
PISTON RING EXPANDER  
Filed Oct. 30, 1923
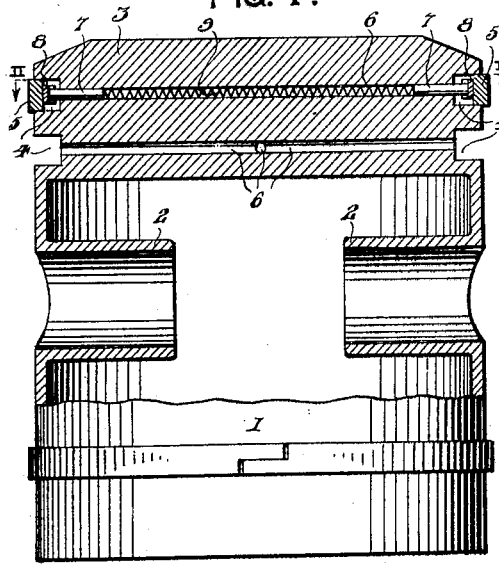
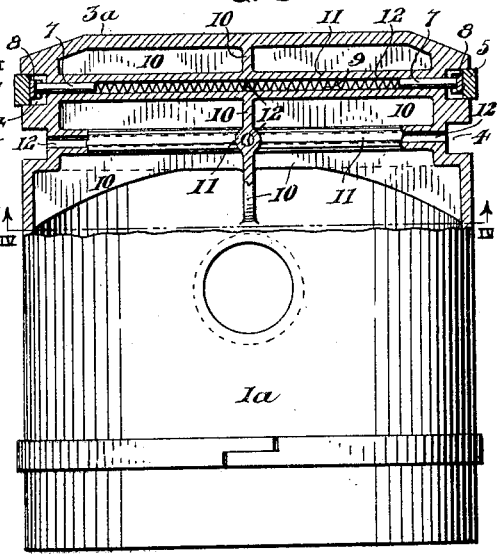
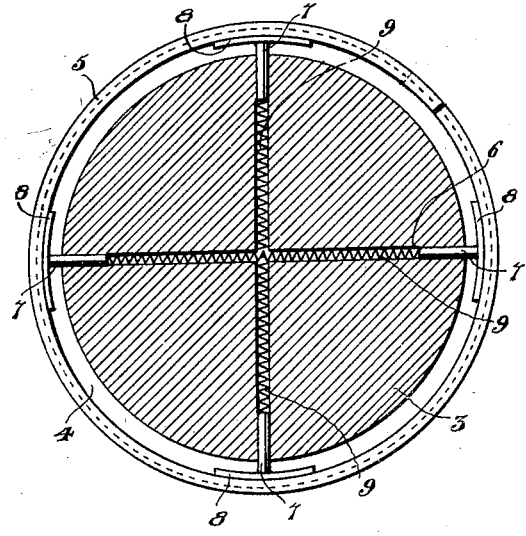
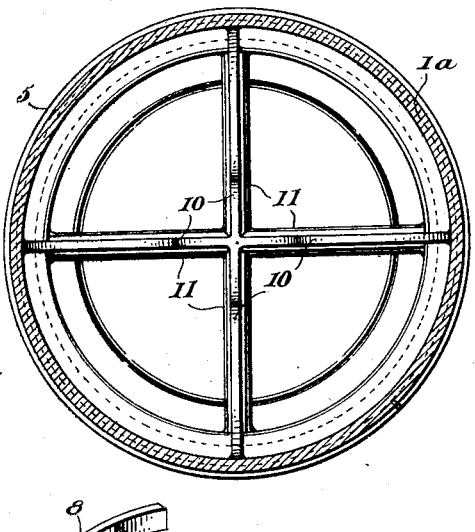
Inventor  
Clint B. Snider  
By T. K. Bryant,  
Attorney.

Patented Dec. 9, 1924.

1,518,940

UNITED STATES PATENT OFFICE.

CLINT B. SNIDER, OF INDEPENDENCE, KANSAS.

PISTON-RING EXPANDER.

Application filed October 30, 1923. Serial No. 671,696.

*To all whom it may concern:*

Be it known that I, CLINT B. SNIDER, a citizen of the United States of America, residing at Independence, in the county of Montgomery and State of Kansas, have invented certain new and useful Improvements in Piston-Ring Expanders, of which the following is a specification.

This invention relates to piston ring expanders and particularly to the type generally set forth in application filed by Clint B. Snider on April 14, 1923, Serial No. 632,050, and embodies improvements in the art thereover.

One of the objects of the present invention is to provide a piston ring expander in the form of spring pressed plunger rods engaging the inner face of a split resilient piston ring with guide openings or passages for the spring pressed plunger rods of the expanders formed in an integral part of the piston.

Another object of the invention is to provide a piston with a head of increased thickness or cross-sectional area with one or more transverse bores formed in the piston head and communicating at their outer ends with the base walls of the annular piston ring receiving grooves for the reception of tensioned piston ring expanders.

Another object of the invention is to employ a piston having internally positioned crossed web portions extending between the inner faces of the piston cylinder walls as bearings for piston ring expanders without the necessity of increasing the thickness of the piston head, guide passages being formed lengthwise of the intersecting webs for slidably receiving the tensioned piston ring expanders.

With the above and other objects in view as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a side elevational view, partly broken away and shown in section of a piston constructed in accordance with the present invention showing the head of increased thickness and the transverse crossed bores therein to slidably receive the tensioned piston ring expanders.

Figure 2 is a cross-sectional view taken on line II—II of Fig. 1,

Figure 3 is a side elevational view, partly broken away and shown in section of another type of piston wherein the guide bores for the tensioned piston ring expanders are formed in intersecting webs extending between the side walls of the piston, Figure 4 is a cross-sectional view taken on line IV—IV of Fig. 3, and Figure 5 is a perspective view of one of the piston ring expander devices.

In the accompanying drawing, the reference numeral 1 designates a piston having the usual inwardly directed bearings 2 for the upper end of a piston rod. As clearly shown in Fig. 1, the head 3 of the piston is of increased vertical cross-sectional area, or of increased thickness compared with the usual type of piston and annular piston ring receiving grooves 4 are formed in the peripheral wall of the piston in line with the enlarged head portion thereof, split resilient piston rings 5 being received in the annular grooves 4 as illustrated.

A plurality of transverse bores extend across the head 3 of increased thickness in line with the piston ring receiving grooves 4, any number of bores 6 in the same plane being provided and intersecting at the central axis of the piston for slidably receiving the tensioned piston ring expanders. Each expander includes a plunger rod 7 carrying an arcuate head 8 at the outer end thereof, the plunger rod 7 being slidably positioned in the outer end of a bore 6 and engaged by the coil spring 9 for normally forcing the expander outwardly into engagement with the inner face of the piston ring 5 as shown in Fig. 1, the expanders being equi-distantly spaced around the periphery of the piston to insure even expanding pressure on the piston ring. The formation of the cross bores 6 is clearly shown in Fig. 2 with the springs 9 disposed in the bores and engaging the expander for normally forcing the same outwardly.

In the form of the invention shown in Figs. 3 and 4, the piston 1ª is provided with a head 3ª of the usual thickness of a standard type of piston and located interiorly of the hollow piston body adjacent the head 3ª are intersecting transversely extending webs 10 formed integral with the side walls of the piston, and integral at their points of intersection. The piston 1 is provided with annular piston ring receiving grooves 4 for the reception of expansion piston rings 5 as described in connection with Figs. 1 and 2.

The intersecting webs 10 are provided with intersecting transversely extending enlarged portions 11 alined with the ring receiving grooves 4, the enlarged portions 11 being bored as at 12 extending completely therethrough and opening at their outer ends in the grooves 4, the expander device shown in Fig. 5 being received in the outer ends of the bores 12 and tensioned by the spring 9 as shown in Fig. 3. In this form of the invention, the reinforcing webs 10 for the piston formed integral therewith constitute bearings for the piston ring expanders, it being understood that any number of transverse webs 10 may be formed in the piston to insure equal pressure of the piston ring expanders upon the tensioned split rings.

In each form of the invention the bearings or mountings for the piston ring expanders are an integral or component part of the piston insuring a rigid mounting for the ring expanders and eliminating the possibility of loose play or friction between relatively movable parts, and while there are herein shown and described the preferred embodiments of the present invention, it is nevertheless to be understood that minor changes may be made therein without departing from the spirit and scope of the invention as claimed.

What is claimed as new is:—

1. In a piston ring expander, the combination with a piston having internal transversely extending intersecting webs disposed adjacent the piston head and annular ring receiving grooves surrounding the piston in line with the webs, of ring expanders including the provision of intersecting bores in the cross webs opening into the grooves and tensioned plunger expanders slidably mounted in the outer ends of the bores engaging the inner face of a piston ring.

2. In a piston ring expander, a piston having a pair of ring receiving grooves, said piston having an internal wall construction in which a double-decker arrangement of intersecting transverse bores are formed, and tensioned ring expanders slidably mounted in the outer ends of the bores engaging the inner faces of the piston rings.

In testimony whereof I affix my signature.

CLINT B. SNIDER.